United States Patent [19]

Harjar et al.

[11] 4,126,321
[45] Nov. 21, 1978

[54] PACKINGLESS BELLOWS SEAL

[75] Inventors: Martin J. Harjar, Vermilion; Donald R. Hastings, Elyria, both of Ohio

[73] Assignee: Nordson Corporation, Amherst, Ohio

[21] Appl. No.: 848,178

[22] Filed: Nov. 3, 1977

Related U.S. Application Data

[63] Continuation-in-part of Ser. No. 705,338, Jul. 14, 1978, Pat. No. 4,079,894.

[51] Int. Cl.² .......................... B05B 7/12; F16J 15/56
[52] U.S. Cl. ........................................ 277/113; 277/12;
277/33; 277/200; 239/15; 239/526; 239/583; 251/335 B
[58] Field of Search ........................ 277/12, 30, 31, 33, 277/200, 205, 212 FB, 113; 239/3, 15, 416, 417, 526, 583; 251/214, 335 B

[56] References Cited

U.S. PATENT DOCUMENTS

| | | | |
|---|---|---|---|
| 2,236,014 | 3/1941 | Smith | 277/113 |
| 2,583,659 | 1/1952 | Martin | 251/335 B X |
| 2,743,738 | 5/1956 | Johnson | 251/335 B X |
| 2,969,926 | 1/1961 | Peeps | 239/526 |
| 3,427,034 | 2/1969 | Lowe | 277/200 |
| 3,528,087 | 9/1970 | Perkins | 251/335 B X |
| 3,727,406 | 4/1973 | Le Feuvre | 251/335 B X |
| 3,741,520 | 6/1973 | Richmond | 251/335 BX |
| 3,780,953 | 12/1973 | Malec | 239/583 X |

FOREIGN PATENT DOCUMENTS 1,116,929  2/1956  France.

*Primary Examiner*—Robert S. Ward, Jr.
*Attorney, Agent, or Firm*—George J. Coghill

[57] ABSTRACT

Disclosed is a static seal suitable for sealing a pull rod or the like to an opening through which the rod passes into a hydraulic conduit. This static seal can be used in a wide variety of apparatus including for example spray coating guns, both electrostatic and non-electrostatic, valve assemblies and the like. Novel static sealing arrangements at each end of a non-machined extruded bellows provide packingless bellows sealing between the rod and the opening. Such a sealing arrangement is compatible with the highly desirable materials of the fluorinated hydrocarbon group, commonly known by the trade name Teflon.

14 Claims, 4 Drawing Figures

PACKINGLESS BELLOWS SEAL

FIELD OF THE INVENTION

This is a Continuation-in-Part of application Ser. No. 705,338 filed July 14, 1976, Pat. No. 4,079,894. This invention relates to seals used for example in hydraulic apparatus, and more particularly relates to a packingless bellows seal between a pull rod, for example, extending into a hydraulic conduit, and an opening into the conduit through which the pull rod extends. This packingless seal can be used in spray coating guns, valves, and the like.

Spray coating, both electrostatic and non-electrostatic are established arts. In non-electrostatic spray coating systems paint is atomized and directed toward some article to be coated. In electrostatic spray coating systems a high voltage electrical charge is applied to the paint particles either before, during or after to the atomization process. The high voltage electrical charge applied to the paint improves the efficiency and coating characteristics of a spray coating system used to coat objects which are held at or near ground potential. There are other applications for and general advantages of electrostatic spray coating systems, however, they need not be discussed here, being well known in the art.

Electrostatic spray coating systems generally employ an atomizing device or gun, a pump or other means to supply paint to the gun, a source of high voltage electrical power, and means connected to the high voltage power and associated with the system to charge the paint. The subject of the present invention deals with static seals used in spray coating guns, valves and the like.

In general, electrostatic coating guns consist of a barrel portion having a paint conduit. One end of the paint conduit is connected to a source of coating material under pressure, and the other end terminates in a spray discharge device or nozzle. The nozzle, in the usual spray coating situation, produces a flat-fan shaped cloud of paint droplets. Many of the nozzles in the past could be rotated so that the fan pattern could be oriented horizontally, vertically or at some intermediate position.

A valve is usually employed to control the discharge of paint. It has been the general practice in various types of spray coating guns to have the valving located in the conduit in the barrel very close to the discharge orifice of the nozzle. Separating surface valves with mating surfaces such as needle and seat or ball and seat type valves have been common. A pull rod extending into the conduit has been used to open and close the valve. Some type of seal between the opening, into the conduit and the pull rod itself prevented the gun from leaking through the opening. The seals in the past have in various guns taken the form of both packing type seals and packingless type seals. Packing type seals are dynamic seals. That is, the pull rod slides inside the packing material which is urged against the periphery of the opening into the conduit and is also urged against an outward surface of the pull rod. These packing type seals are adequate for some systems but had drawbacks in others, especially electrostatic systems. Packing seals of their very nature did not provide an electrical seal. Specifically, in a system using paint having high to moderate electrical conductivity, an electrical path could be established along the surface of the pull rod to the exterior of the conduit, since the paint would wet the surface of the rod. This electrical leakage path is undesirable in electrostatic spray coating systems since it could present a path which would short the high voltage electrical power to ground, or present a safety problem of sparking or shock to the operator. Further, the sliding caused the packing material to wear, especially when the coating material in the conduit was abrasive.

To overcome the disadvantages of the packed seal, various electrostatic spray coating guns have employed packing-less seals. These packingless seals generally took the form of a deformable diaphragm, such as a bellows, surrounding the rod. In the bellows type, one end of the bellows has a static seal to the periphery of the opening into the conduit, and the other end of the bellows has a static seal around the pull rod. The seals are termed "static" because there is no sliding of the rod over the seal. When the pull rod moves the bellows flexes while the seals remain fixed with respect to the sealing surfaces.

The prior art bellows/static seal arrangements solved some of the problems associated with sliding seals, the most important being the friction wear and electrical insulation. However, new problems arose in the prior art bellows seals. It has become desirable to fabricate the bellows from a fluorinated hydrocarbon polytetrafluoroethylene and commonly known by the tradename TFE "Teflon", because of the superior electrical and chemical properties of TFE Teflon. Electrically, TFE Teflon is a good insulation and does not arc-track. Chemically, TFE Teflon is impermeable to almost all coating material; that is the coating materials will not chemically attack the TFE Teflon, nor will these coating materials permeate the structure of the TFE Teflon. The prior art teflon bellows had heavy walled mechanical coupling type ends. For an example, see U.S. Pat. No. 3,747,850. The ends of such bellows, as well as the bellows itself, had been machined parts. The heavy walled machined ends of these prior art bellows were generally sealed to the rod and to the opening by means of mechanical couplings similar to those used for some types of pipes. The heavy walls did not readily deform greatly when urged against another surface. Therefore, either the sealing surfaces required close machining tolerances, or a gasket. Close machine tolerances are expensive, and gaskets such as O-rings do not exhibit the desirable characteristics of Teflon. Therefore, the seals were either expensive, or alternatively, if a gasket were used there was a weakness in the seal at the gasket.

SUMMARY OF THE INVENTION

The subject of the present invention is a spray gun which overcomes the shortcomings of the prior art listed above. Various novel aspects of this gun can be utilized in electrostatic or non-electrostatic spray coating guns. Still further, various novel aspects of this gun combine to provide compatibility with a greater range of coating materials and applications than have heretofore been possible.

One aspect of this invention is an improved bellows type seal between an opening into the coating material conduit in the barrel of the spray gun and a pull rod which extends into the conduit through the opening to control a valve in the conduit. It is desirable to have the bellows made out of Teflon, and specifically, tetrafluoroethylene, because of the superior electrical and chemical properties of the material (as described above). By a new process (which is not part of the subject of this invention) an inexpensive bellows can be formed from a thin walled tubular piece of Teflon without machining. The end product is a bellows where each end of the bellows has a thin walled continuous tubular extension of the same material which forms the convolutes of the bellows. The diameter of the thin walled extensions of the convolutes of the bellows in the preferred embodiment approximate the diameter of the smaller portion of the convolutes. Because of the low cost, it is desirable to use this type of bellows. However, when attempting to form the seals at the ends of such a bellows it was found that the Teflon would "flow" out of many types of sealing arrangements where two surfaces are urged together tight enough to form a hydraulic seal. Therefore, new types of seals for the ends were required. It is one object of this invention to provide seals for this type of bellows construction between one end of the bellows and the opening, and between the other end and the pull rod. After devising the seals it was found that these same seals were compatible with other materials besides Teflon.

It is a further desirable aspect of a bellows type seal that all surfaces exposed to the material in the conduit be impermeable to that material. Therefore, it is a further object of this invention to provide static seals at the ends of the bellows mentioned above, where all materials exposed to the bellows and seals are impermeable to the material in the conduit.

It is a further object of this aspect of the invention to provide seals and bellows which are easily constructed, disassembled, and repairable.

It is a further object of this invention to provide a bellows type sealing arrangement constructed of materials which have superior electrical chemical and sealing qualities.

One specific aspect of this invention is the seal between the thin walled extension of the bellows mentioned above to the pull rod in the conduit. The extension of the bellows is trapped between urged tapered locking surfaces of the rod and a bushing-like member. In a preferred form the tapered locking surface on the rod constitutes part of a bulge on the rod which is larger than the inside diameter of the thin walled extension of the bellows. Further, in the preferred embodiment, the thin walled extension of the bellows is pushed over and at least partially encompasses the largest part of the bulge, the bulge not being large enough to permanently deform the thin walled extension of the bellows.

Another specific aspect of this invention is the seal between one end of the bellows and the opening into the conduit. This seal comprises a Teflon jacketed elastomeric washer around one tubular extension of the bellows and urged against the periphery of the opening into the conduit. A solid washer also around the same extension of the bellows has one side urged against this Teflon jacketed washer. The end of this extension of the bellows is flared so that the outward surface of the bellows can be urged against the other side of the solid washer. An elastomeric washer around the rod is urged against the inward surface of the bellows at the flare by suitable means urging the whole assembly together.

The bellows sealing arrangement described herein is compatible not only with electrostatic spray coating guns, but is desirable in other types of apparatus wherein a control rod or the like extends into a conduit from the outside of the conduit through an opening. A typical example would be a hydraulic valve.

DETAILED DESCRIPTION OF THE PREFERRED EMBODIMENT

Figure 1:
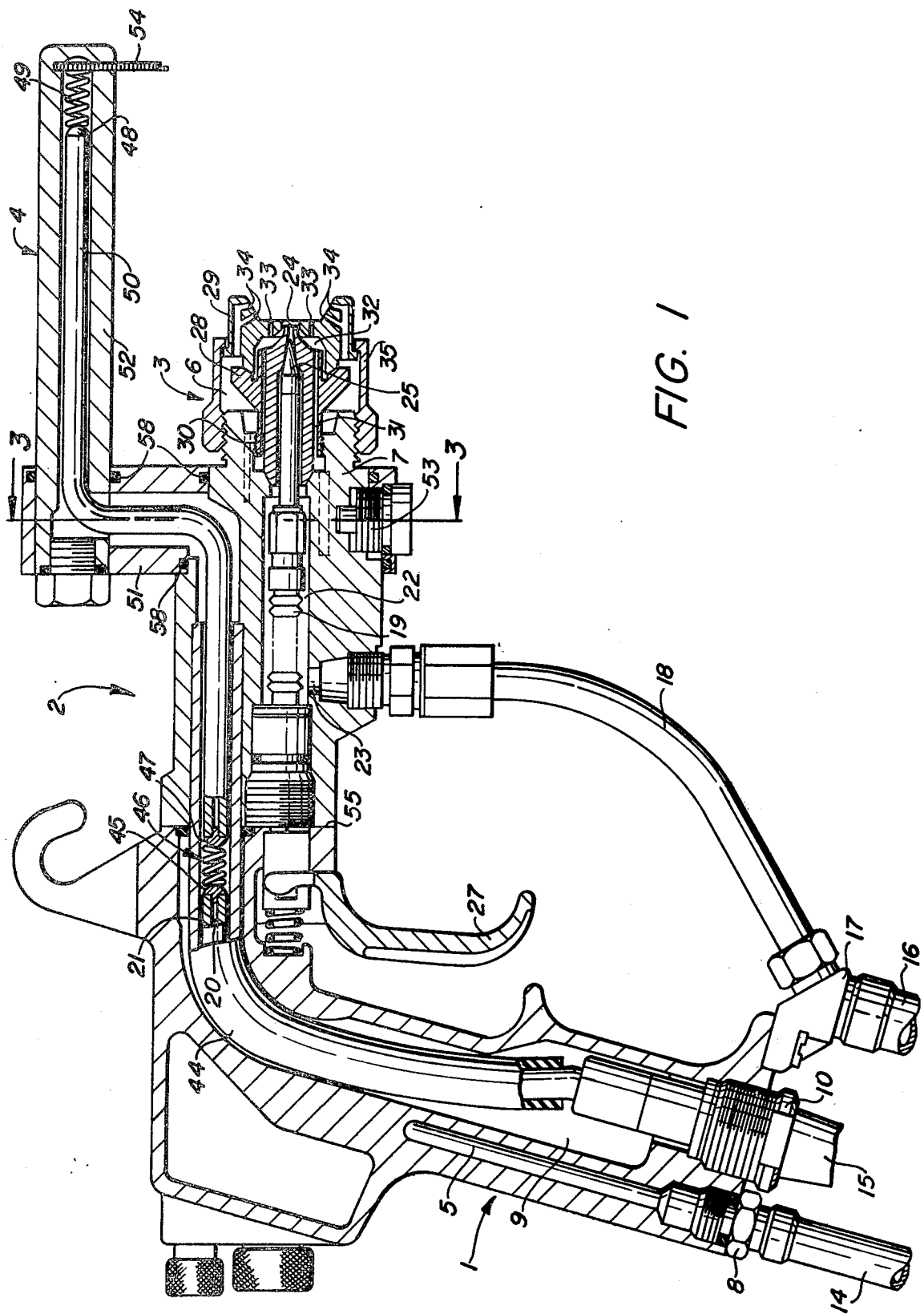
FIG. 1 is a cross-sectional view of an air atomizing electrostatic spray gun embodying a preferred form of this invention.

FIG. 1 shows a cross-sectional view of an electrostatic spray gun. The spray gun generally consists of a metallic handle 1, a barrel 2 made of insulating material such as Delrin, a nozzle 3, and an electrode extension 4. One end of the barrel 2 is mounted to the handle 1, while the nozzle 3 is located at the other end of the barrel 2. The electrode extension 4 is mounted for annular displacement about the barrel 2.

The handle 1 is made of metal and is held at electrically ground potential through a suitable electrical connection (not shown). An air line 14 is connected to an air passage 5 in the handle 1 through a suitable connector 8. The air passage 5 extends through the handle 1 and barrel 2 and eventually communicates with a first air chamber 6 and a second air chamber 7 both in the barrel 2 close to the nozzle 3. The air passage 5 extends for part of its length through the handle 1 and barrel 2 in a plane different than that through which the cross section of FIG. 1 is taken, and therefore, phantom lines in the barrel 2 close to the nozzle 3 indicate the openings of the air passage 5 to these first and second air chambers 6 and 7.

Also connected to the butt end of the handle 1 is an insulated electrical cable assembly 15. The cable assembly 15 is secured to the butt end of the handle 1 by a suitable retaining nut 10. An extension 20 of the cable assembly 15 is carried into an electrical conduit 9 in the handle 1. The core of the cable assembly 15 can be any suitable electrical conductor such as stranded wire or a cable core having distributed resistance in it such as described in U.S. Pat. No. 3,348,186 issued to Rosen. A polyethylene sheath 21 surrounds the cable extension 20 to provide electrical insulation except for an electrical contact 45 at the end of the extension 20. The other end of cable 15 is connected to a high voltage power supply (not shown). The specific novel details of the electrical path through the spray gun will be described in further detail below.

Still describing the gun generally and now referring to the paint supply path of the gun, a paint supply hose 16 carries paint under pressure to a paint supply hose connection block 17. The connection block 17 is metallic and is attached physically and electrically to the butt end of the handle 1 of the gun. A passage (not shown) through the block 17 communicates with one end of a nylon paint supply link 18. The other end of the paint supply link 18 communicates with a paint inlet opening 23 in the barrel 2 of the gun. The link 18 is attached between the block 17 and the barrel 2 of the gun by suitable pressure fluid connections.

The paint inlet opening 23 communicates with a paint conduit 22 in the barrel 2. The paint conduit 22 progresses to a discharge orifice 24 of the nozzle 3. Needle and seat valving is provided immediately upstream of the discharge orifice 24. The needle 25 of the needle and seat valve assembly is attached to a pull rod 26 made of an acetal homopolymer commonly known by the Du-Pont trade name "Delrin" (shown in FIG. 2). The pull rod 26 extends into the paint conduit 22 through an opening at the rear of the paint conduit 22. The paint conduit 22 is sealed closed around the pull rod 26 by means of a TFE Teflon bellows 19 having a static seal to the rod at one end, and a static seal to the periphery of the opening at the other end. The details of this sealing arrangement will be described below.

The pull rod 26 is connected to a spring loaded trigger 27. When the trigger 27 is displaced in a rearward direction, the needle 25 is retracted from the seat behind the discharge orifice 24, and allows paint to be discharged.

When spraying abrasive coating materials, the needle and seat valve assembly is preferably made of an abrasive resistant material such as ceramic or carbide.

Referring now to the nozzle 3 portion of the gun, generally it can be seen by those skilled in the art that it is similar to prior art air atomizing nozzles in many respects. The nozzle 3 consists of a fluid nozzle portion 28 with a ceramic liner 30, air cap 29 and a retaining nut 35. All of these parts other than the liner 30 are made of Delrin. This nozzle assembly is similar to nozzles old in the art, save for the ceramic liner 30 in the fluid nozzle 28.

The fluid nozzle 28 has threads on the outward surface of its rearward end for threadable attachment to the forward end of the fluid passage 22 in the barrel 2. The fluid nozzle 28 is threaded into the barrel 3 until a rearward frustro-conical outer surface on the liner 30 engages a mating surface surrounding the flow passage 22. These two surfaces form a hydraulic seal so that the fluid passage 22 extends only through the interior of the liner 30 to the discharge orifice 24. The inside surface of the liner, immediately behind the discharge orifice of 24 of the fluid nozzle 28, forms the seat in the needle and seat valve.

An air cap 29 partially surrounds the forward end of the fluid nozzle 28. The discharge orifice portion 24 of the fluid nozzle 28 extends through a centrally disposed hole in the air cap 29. A retaining nut 35 threadably engages the barrel 3 and urges a rearward frustro-conical surface of the air cap 29 against a mating surface on the fluid nozzle 28 through the interaction of a circumferential annular inward flange at the forward end of the retaining nut 35 with circumferential outward flange on the air cap 29.

The first air chamber 6 in the nozzle portion is formed between the surfaces of the barrel 3, retaining nut 35, air cap 29 and fluid nozzle 28. Air passages in the air cap communicate with the first air chamber 6 and terminate in air discharge openings 34.

Several air passages 31 are formed in the fluid nozzle 28. These air passages are distributed uniformly around the axis of the fluid flow passages and function to communicate pressurized air from the second sealed air chamber 7 in the nozzle portion to a third air chamber 32 close to the discharge orifice 24 of the fluid nozzle 28. Holes 33 in the air cap discharge air from the third air chamber 32. In operation, as is known in the art, the interaction of air being discharged from the air holes 33, 34, in the air cap 29, interact to atomize and shape the stream of fluid being discharged from the nozzle orifice 24.

The sealing surfaces of the air cap 29 are radially symmetrical, and, therefore, the air cap 29 is rotatable about the axis of the fluid discharge nozzle 24. That is, the air cap can be rotated so that the flat fan spray of the nozzle can be oriented in the plane of the paper, perpendicular to the plane of the paper of any angle in between.

Referring again to the fluid path in general, it is noted here that the fluid conduit 22 is made large enough for most of its extent to maintain fluid velocities at a relatively low value. The only places where the fluid velocity in the fluid conduit 22 is at any relatively high value is around the needle and seat valve and at the fluid discharge orifice 24. However, because the needle and seat and the orifice 24 are formed in the unitary abrasion resistant liner 30 the spraying of highly abrasive materials will not rapidly deteriorate the surfaces and components.

There are alternative approaches to constructing a wear resistant fluid nozzle. The approach taken here is a Delrin body with a wear resistant liner 30. The fluid nozzle 28 could have been made totally out of wear resistant material, however, it has been found that the liner approach offers distinct advantages. It is desirable to use ceramic materials for the wear resistant surfaces in the fluid nozzle. However, ceramic is brittle. The Delrin body provides an added layer of mechanical shock insulation for the ceramic material. If the whole fluid nozzle were made of ceramic the chance of fracture would be increased.

Even if a stronger material such as carbide were used for the wear resistant surfaces, problems would arise. It is desirable to make the fluid nozzle in the shape depicted in FIG. 1, so that the gun is compatible with other fluid nozzles and air caps which are considered as standard in the industry. The desirability of using "standard" fluid nozzles and air caps is based upon the need for a versatile spray gun which can use several different types of fluid nozzles and air caps. It is noteworthy that this fluid nozzle is topologically a rather complex structure containing mating surfaces and small air passages. If the fluid nozzle were a single piece of abrasion resistant material, the fabrication process for the fluid nozzle would be further complicated; namely, the very formation of the surfaces and maintenance of engineering tolerances would be difficult. With the "liner" approach used in the preferred embodiment, the fabrication process is simplified.

Figure 2:
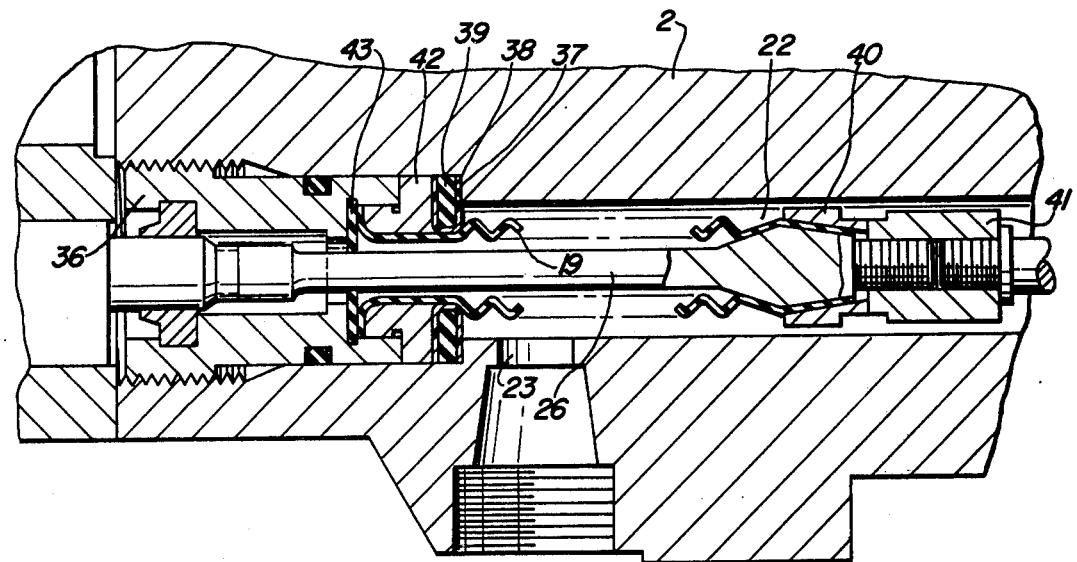
FIG. 2 is an exploded cross-sectional view of the bellows sealing arrangement for the valve pull rod extending into the coating material conduit in the barrel portion of the spray gun of FIG. 1.
Figure 3:
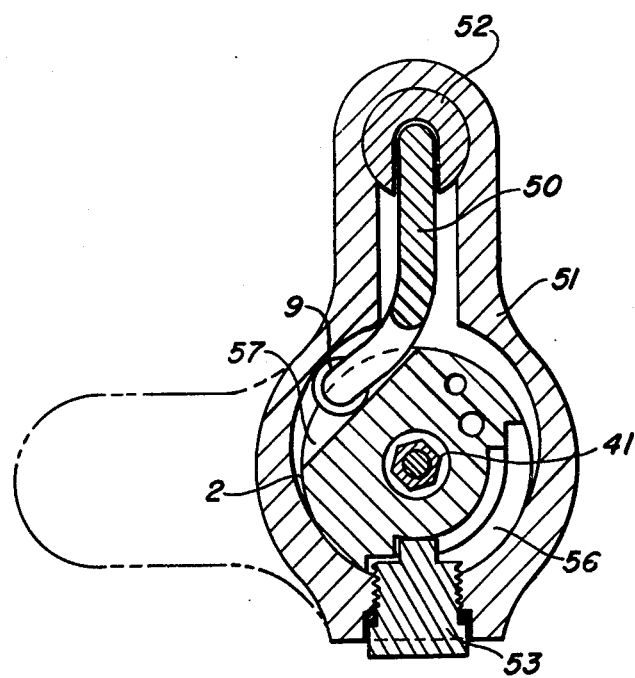
FIG. 3 is a cross-sectional view of the spray gun of FIG. 1 through the plane defined by the dotted line 3 in FIG. 1, which shows the effect of angular displacement of the electrode extension on the electrical path.

Turning now to specific details, and referring to FIG. 2, the details of the bellows sealing arrangement between the opening into the fluid conduit 22 and the pull rod 26 which extends into the fluid conduit 22 can be observed. As can be seen in FIG. 2, the pull rod 26 extends into the fluid conduit 22 from the rear of the spray gun. A generally cylindrical or tubular TFE-teflon bellows 19 surrounds the rod 26. The convoluted section of the bellows 19 is thin walled and has thin walled cylindrical extensions at each end. At the rearward end of the bellows 19, the cylindrical extension has been flared. At the forward end of the bellows, the cylindrical extension has been pushed over and encompasses a bulge on a pull rod 26. The bulge on the pull rod 26 is large enough to slightly expand the thin walled extension of the bellows 19 but is not large enough to permanently deform it. The cylindrical extension must be at least moderately resilient so that upon pushing the forward end of the bellows 19 beyond the largest part of the bulge the resiliency of the extension causes it to attempt to return to its original size and, thereby, snugly conform to the shape of the bulge. The forward portion of the bulge is a conical locking tapered surface. A bushing type member 40 has an internal locking tapered surface which mates to that on the bulge of the rod 26. A nut 41 is threadably attached to the pull rod 26 and is screwed down to such an extent that the bushing type member 40 locks the end of the tubular extension of the bellows 19 to the pull rod 26.

At the rearward end of the bellows 19 is a second cylindrical extension of the convolutes with a flared rearward end. A teflon jacket 38, surrounds the tubular extension of the bellows. The jacket 38 is made of teflon and is generally in the form of two thin walled deformable annular membranes which are spaced apart along a common axis but which are continuous through their smaller or inner annular diameter. The space between the membranes is filled with rubber or some other elastomeric material 39. One face of the jacket is urged against an annular face 37 of the barrel 2, which face 37 surrounds the opening into the fluid conduit 22. The jacket is urged against the annular face 37 around the fluid conduit 22 by means of a Delrin second washer means 42. The flare of the rearward extension of the bellows 19 is in urged engagement with the rearward surface of the second washer means 42. A rubber washer is urged against the inside surface of the bellows at the flare by a Delrin packing nut 36. The packing nut 36 forces the washer 43 against the flare which in turn is urged against the second washer means 42 which in turn is urged against the Teflon jacketed elastomeric washer 39 which in turn is urged against the annular face surrounding the opening into the fluid conduit 22.

In this arrangement for the static seals at each end of the bellows, fluid is only exposed to Delrin or teflon. These two substances exhibit excellent chemical resistance to almost all spray coating fluids. There are no rubber surfaces such as O-rings or packings which contact the fluid in the fluid conduit 22. Further, these static seals allow the use of a teflon bellows which does not require machining in its fabrication.

Figure 4:
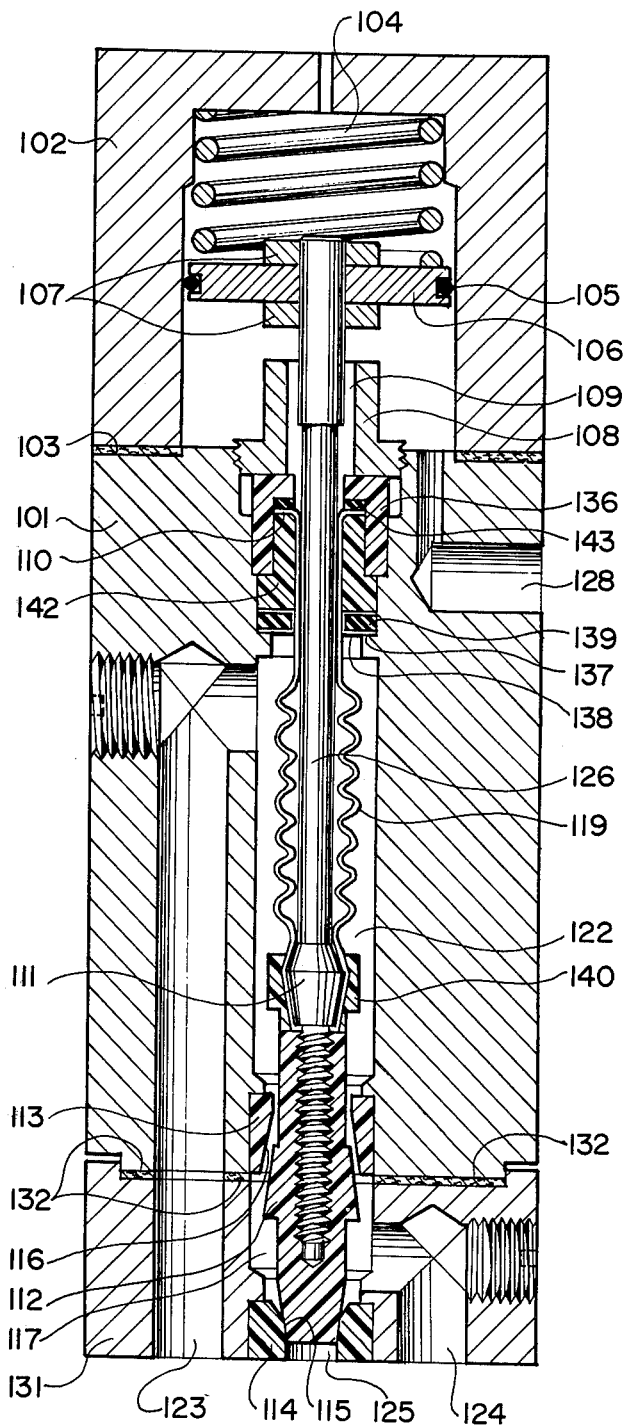
FIG. 4 is a cross-sectional view of a three-way valve utilizing a packingless bellows seal.

By referring to FIG. 4 it can be seen that the static sealing arrangement can be used in hydraulic valves, and the like, as well. FIG. 4 is a cross-sectional view of a three-way hydraulic valve utilizing the novel static sealing arrangement of the present invention. The valve consists generally of a valve body 101 portion, lower valveseat body 134 portion, and in this particular embodiment a pneumatic air cylinder body 102 portion to actuate the valving. The air cylinder body 102 is secured to the valve body 101 by a suitable securing means such as screws (not shown). A gasket 103 seals the air cylinder body 102 to the valve body 101. The lower valve seat body 134 likewise is attached to the valve body 101 by suitable retaining means (not shown) and a hydraulic seal is provided at the junction of these two members by a suitable gasket 132. The valve is provided with first, second and third fluid ports 123, 124 and 125 respectively. In operation, the ports would have suitable pressure connection fittings attached to them. The first fluid port 123 connects by means of a passage through the lower valve seat body 134 and partially through the valve body 101 to a passage 122 centrally located in the valve body 101. At the lower part of this centrally located passage 122 is located a valve seat member 113 having a conically tapered surface 116. The centrally located fluid passage 122 is connected through the valve seat member 113 to a valve chamber 117. Below this valve chamber 117 is located a second valve seat member 114 also having a conically tapered surface 115. The valve chamber 117 is connected to the third port 125 through the valve seat 115 on this second valve seat member 114. The second fluid port 124 is connected directly to the valve chamber 117.

The respective valve seats 115 and 116 on valve seat members 114 and 113 are oriented such that the larger diameters of their tapers are facing each other. A double valve stem assembly which comprises a valve stem 112 having a tapered portion to mate with the valve seat 115 on the valve seat member 114 and an oppositely facing tapered portion which mates to the valve seat 116 in valve seat member 113. The separation of the two valve stem surfaces are such that only one of them at a time can be engaged with its respective valve seat. The position of the valve stem assembly is controlled by a pull rod 126 threadedly attached to the valve stem assembly. The pull rod 126 is in turn connected to and actuated by the air cylinder assembly attached to the top of the valve body 101.

The air cylinder comprises a cylinder body 102 having a central cylindrical bore or cavity. A piston 106 is slidingly sealed to the periphery of the cylindrical bore by means of an O-ring 105. The central portion of the piston is threadedly attached to an end of the pull rod 126. Locking nuts 107 secure the piston 106 to the pull rod 126. A spring 104 biases the piston in its downward position. An air port 128 which communicates with the central cavity in the cylinder body 102 is adaptable to be connected to a source of air in order to pressurize the lower side of the piston 106 in air cylinder body 102. With no air pressure supplied to air port 128 the piston is biased by spring 104 such that the pull rod 119 forces the valve stem assembly to engage the lower valve seat 115, thereby connecting the first fluid port 123 to the second fluid port 124 and closing the third fluid port 125. When air pressure is supplied to the port 128 the piston forces the pull rod 116 in an upward direction, hence causing the valve stem 112 to engage the upper valve seat 116. With the air cylinder pressurized, the valve stem 112 is forced to move to its upper position, thereby connecting the second fluid port 124 with the third fluid port 125, while blocking the first fluid port 123.

As can be seen, the fluid passage 119 is sealed from the air cylinder cavity by means of a static bellows sealing arrangement as was described previously with respect to the spray gun.

The pull rod 126 extends from the air cylinder into the fluid passage 122 in the valve body 101 through an opening between the air cylinder bore and the fluid passage 122. A generally cylindrical tubular TFE-Teflon bellows 119 surrounds the rod 126. The convoluted section of the bellows 119 is thin walled and has thin walled cylindrical extensions at each end. At the air cylinder end of the bellows 119 the cylindrical extension has been flared. At the lower end of the bellows 119, the cylindrical extension has been pushed over and encompasses a bulge 111 on the pull rod 126. The lower portion of the bulge 111 is a conical locking tapered surface. A bushing type member 140 has an internal locking tapered surface which mates to the locking tapered surface on the bulged portion 111 of the rod 126. The valve stem member 112 is threadably attached to the pull rod 126 and is screwed down to such as extent that the bushing type member 140 locks the end of the tubular extension of the bellows 119 to the pull rod 126.

At the upper end of the bellows 119 is a second cylindrical extension of the convolutes with a flared uppermost end. A Teflon jacketed elastomeric washer surrounds the tubular extension of the bellows. The Teflon jacket 138 is generally in the form of two thin walled deformable annular membranes which are spaced apart along a common axis but which are continuous through their smaller or inner annular diameter. The space between the membranes is filled with a washer 139 made from rubber or some other elastomeric material. One face of the jacket 138 is urged against the face of an annular step 137 surrounding the opening into the conduit 122. The jacket is urged against the face of the annular step 137 by means of a Delrin second washer means 142. The flare of the uppermost extension of the bellows 119 is in urged engagement with the uppermost surface of the second washer 142. A rubber, elastomeric washer 143 is urged against the inside surface of the bellows at the flare by a packing nut 108 acting through a spacer 136. Packing nut 108 forces the spacer 136 against the elastomeric washer 143. Elastomeric washer 143 is in turn urged against the flare, the flare in turn being urged against the second washer means 142 which second washer means 142 in turn is urged against the Teflon jacketed elastomeric washer 139 which in turn is urged against the annular face surrounding the opening into the fluid conduit 122.

Having now described our invention, it can be seen that many modifications can be made to the gun as described without departing from the scope and spirit of the invention of which we claim:

1. A hydraulic seal between an opening into a conduit and a rod extending into the conduit through the opening comprising:
   a deformable diaphragm surrounding part of the rod, having a first end hydraulically sealed to the periphery of the opening, and having a generally tubular, expandable, but at least moderately resilient extension at a second end;
   a bulge on the rod, comprising a first portion having an increasing cross-sectional dimension and a second portion having a diminishing cross-sectional dimension with the first portion being closer to the opening than the second portion, the bulge having an outside diameter at its point of maximum bulge which is larger than the inside diameter of the second end of the diaphragm, at least one portion of the bulge being a frusto-conical tapered locking surface, and the locking tapered surface of the bulge being at least partially encompassed by the tubular portion of the diaphragm;
   member having an inner mating surface which mates to the tapered locking surface on the bulge, said mating surface being around part of tubular portion of the diaphragm which encompasses the tapered locking surface of the bulge;
   means urging said inner mating surface toward the tapered locking surface through the part of the second end of the diaphragm which is between the tapered locking surface of the bulge and the mating surface of said member.

2. The apparatus of claim 1 wherein the diaphragm is a generally tubular bellows.

3. The apparatus of claim 1 wherein the bulge is on a part of the rod which extends into the conduit and the locking tapered surface is on said second portion of the bulge.

4. The apparatus of claim 3 wherein:
   said member is a bushing;
   and the urging means a nut threadably attached to the rod, which forces the bushing toward the bulge.

5. The apparatus of claim 2 wherein:
   said member is a bushing;
   and the urging means a nut threadably attached to the rod, which forces the bushing toward the bulge.

6. The apparatus of claim 2 wherein the conduit is the paint conduit in the barrel of an electrostatic spray gun.

7. A hydraulic seal between an opening into a conduit and a rod extending into the conduit through the opening comprising;
   a thin walled hollow tubular bellows having a centrally located convoluted section, a hollow thin walled generally cylindrical extension of the convoluted section at a first end, which extension is expandable and at least moderately resilient, and said bellows having an extension of the convoluted section at a second end hydraulically sealed to the periphery of the opening;
   a bulge on the rod, comprising a first portion having an increasing cross-sectional dimension and a second portion having a diminishing cross-sectional dimension with the first portion being closer to the opening than the second portion, the bulge having an outside diameter at its point of maximum bulge which is larger than the inside diameter of the extension of the bellows at the first end, at least one portion of the bulge being a frusto-conical tapered locking surface, and the tapered locking surface of the bulge being at least partially encompassed by the extension of the bellows at the first end; and
   a member having an inward surface effective to urge the part of the first end of the bellows which encompasses the tapered locking surface into sealing engagement with the tapered locking surface.

8. A hydraulic seal between an opening into a conduit and a rod extending into the conduit through the opening comprising:
   a thin walled, hollow, tubular bellows around the rod, having a centrally located convoluted section, a hollow thin walled generally cylindrical extension of the convoluted section at a first end, which extension is expandable and at least moderately resilient, and an extension at a second end hydraulically sealed to the periphery of the opening;
   said rod having a bulged portion with an outward surface, said bulged portion having a section of increasing cross-sectional dimension, a section of decreasing crosssectional dimension and a section intermediate therebetween of maximum cross-sectional dimension, said outward surface being at least partially encompassed beyond said section of maximum cross-sectional dimension by the extension of the bellows at said first end; and
   a member having an inward surface which conforms to at least part of said outward surface of said bulged portion of said rod, being effective to compress said extension of the bellows at said first end into sealed engagement with said part of said outward surface.

9. A hydraulic seal between an opening into a conduit and a rod extending into the conduit through the opening, comprising:

a thin walled bellows extending into the conduit having an inside and outside surface, made from a deformable but at least moderately resilient material, the bellows surrounding part of the rod, one end of the bellows being hydraulically sealed to the rod, the other end of the bellows being a generally thin walled cylindrically shaped extension of the bellows which passes through the opening and having a thin walled flare at the end;

a first washer member outside of the conduit and around the extension of the bellows, having two deformable thin spaced apart annular membranes which are mutual extensions of each other through their inside annular diameters, the mutual extension portion also defining a hole through the first washer type member through which the extension of the bellows passes;

an elastomer in the space between the two membranes of the first washer and engaging both membranes;

a hydraulic seal formed by surface contact between a first of the membranes of the washer type member and the periphery of the opening into the conduit;

a hydraulic seal between the second membrane of the washer type member and the outside surface of the bellows at the flare effected by surface contact to the second membrane and to the outside surface of the bellows at the flare;

an elastomeric washer around the rod in surface contact to the inner surface of the bellows at the flare; and means acting through the elastomeric washer maintaining all of the surface contacts in sealing engagement.

10. The apparatus of claim 9 which further comprises a third washer member which is rigid and around the extension of the bellows and located between the first washer member and the flare, wherein the hydraulic seal formed between the second of said membranes and the outside of the bellows at the flare is made by urged surface contact of one surface of the third washer member and the second of the membranes, and urged surface contact of a second surface of the third washer with the outside surface of the bellows at the flare.

11. The apparatus of claim 10 wherein the tubular extension of the bellows has about the same outside diameter as the outside diameter of the smaller parts of the convolutes of the bellows.

12. A hydraulic seal between an opening into a conduit and a rod extending into the conduit through the opening, comprising:

a thin walled bellows, having an inside and outside surface, made from a deformable but at least moderately resilient material, the bellows surrounding part of the rod, one end of the bellows being hydraulically sealed to the rod, the other end of the bellows being a generally thin walled cylindrically shaped extension of the bellows which passes through the opening and having a thin walled flare at the end;

a first washer member around the extension of the bellows, having two deformable thin spaced apart annular membranes which are mutual extensions of each other through their inside annular diameters, the mutual extension portion also defining a hole through the first washer member through which the extension of the bellows passes;

an elastomer in the space between the two membranes forming the first washer and engaging both membranes;

a second washer member which is rigid, which surrounds the extension of the bellows, is located between the first washer member and the flare, and has an inside diameter larger than the outside diameter of the extension of the bellows and smaller than the diameter of the flare;

an elastomeric washer around the rod; and means around the rod, positioned such that the elastomeric washer is between said means and the flare, urging the elastomeric washer against the inside surface of the bellows around the periphery of the flare, whereby surfaces of the bellows, the second washer member, the first washer member, and the periphery of the opening into the conduit are maintained in sealing relationship.

13. A hydraulic seal between an opening into a conduit and a rod extending into the conduit through the opening, comprising:

a thin walled bellows having an inside and outside surface, made from polytetrafluoroethylene, the bellows surrounding part of the rod, one end of the bellows being a generally thin walled cylindrically shaped extension of the bellows which passes through the opening and having a thin walled flare at the end;

a Teflon jacketed elastomeric washer around the extension of the bellows, and outside of the conduit;

a hydraulic seal formed by urged surface contact between a first side of the Teflon jacketed washer and the periphery of the opening into the conduit;

a hydraulic seal between the second side of the Teflon jacketed washer and the outside surface of the bellows at the flare effected by urged surface contact to said second side and to the outside surface of the bellows at the flare;

an elastomeric washer around the rod, and in urged surface contact to the inner surface of the bellows at the flare; and means acting through the elastomeric washer maintaining all of the urged surface contacts in sealing relationship.

14. A hydraulic seal between an opening into a conduit and a rod extending into the conduit through the opening, comprising:

a thin walled bellows extending into the conduit having an inside and outside surface, the bellows surrounding part of the rod, one end of the bellows being hydraulically sealed to the rod, the other end of the bellows being a generally thin walled tubular extension of the bellows with a flared end which passes through the opening;

a jacketed elastomeric washer around the rod and in sealed relationship with the periphery of the opening; and means to effect a seal between the outside surface of the bellows at the flare and said jacketed elastomeric washer.

* * * * *